Patented Feb. 12, 1952

2,585,359

UNITED STATES PATENT OFFICE 2,585,359

PERMANENTLY FUSIBLE DIALLYL ESTER COPOLYMERS AND COMPOSITIONS OF NITROCELLULOSE THEREWITH

Richard R. Whetstone, Albany, and Theodore W. Evans, Oakland, Calif., assignors to Shell Development Company, San Francisco, Calif., a corporation of Delaware No Drawing. Application December 11, 1948, Serial No. 64,914

14 Claims. (Cl. 260—17)

This invention relates to a new form of copolymeric allyl ester resins and to compositions of the resin with nitrocellulose.

Nitrocellulose is widely used as a surface coating material to protect and beautify various articles such as automobile bodies and furniture. When employed for this purpose, the nitrocellulose is applied in solution as a lacquer which customarily also contains a non-drying alkyd resin. The alkyd resin gives the resulting surface coating film gloss, adhesion and durability which would be lacking were nitrocellulose alone used. The non-drying alkyd resins employed for this purpose have been, in general, glycerolphthalic anhydride alkyds modified so as to be soluble but non-convertible with non-drying fatty acids like cocoanut oil fatty acid or castor oil fatty acid.

We have now discovered a new class of copolymeric resins which when used with nitrocellulose give a surface coating film which not only has the desired gloss and adhesion but also imparts weathering durability to the film which greatly exceeds that of nitrocellulose compositions known heretofore so far as we are aware. In general, this resin component is a permanently fusible copolymer of an allyl alcohol ester of a dicarboxylic acid with an allyl alcohol ester of a saturated fatty acid. The new copolymer for use with nitrocellulose is obtained by polymerizing a mixture consisting of an appreciable proportion of the diallyl ester with the monoallyl ester, but not so great a proportion of the diallyl ester that the copolymer is subject to gelation and infusibilization. In other words, the formed fusible copolymer is sufficiently free of residual olefinic unsaturation so that further polymerization thereof to the infusible state is not possible. For example, it may be heated for prolonged times even in the presence of a peroxide polymerization catalyst without gelling. Consequently, the product is what may be termed a permanently thermoplastic or fusible copolymer.

The outstanding durability of nitrocellulose films containing the new copolymer as resin component therewith will be evident from consideration of prolonged weathering tests upon compositions thereof. The copolymers used in the tests were prepared as follows, wherein the parts are by weight.

*Example I*

Allyl propionate was copolymerized with 8.2% diallyl phthalate by heating a mixture consisting of 6026 parts of allyl propionate and 542 parts of diallyl phthalate to which was added 2% di(tertiary amyl) peroxide as catalyst. The copolymerization was effected by heating in a vessel fitted with a reflux condenser at 130° C. for 32 hours. The unpolymerized allyl propionate was then removed by blowing the product with carbon dioxide at 150° C. under 1 to 3 mm. pressure for about 12 hours. The amount of recovered allyl propionate showed that the conversion to copolymer was 87% so the copolymer contained about 9.5% of chemically combined diallyl phthalate. The permanently fusible quality of the copolymer was evident from the absence of gel formation during the blowing operation at the elevated temperature. The resulting product was a clear and extremely viscous semiliquid at room temperature (about 20° C.). It was readily soluble in acetone, methyl isobutyl ketone or normal butyl acetate. It was compatible with R. S. ½ sec. nitrocellulose when tested in ratios of copolymer to nitrocellulose of 1 to 2 to 10 to 1.

*Example II*

In like manner, a mixture of 6009 parts of allyl propionate and 451 parts of diallyl maleate to which was added 2% di(tertiary amyl) peroxide was subjected to copolymerization at 130° C. for 32 hours. After blowing the unpolymerized allyl propionate from the product at 150° C. under 1 to 3 mm. pressure, it was found that there had been a conversion of 81.6% to the permanently fusible copolymer which thus contained about 8.6% diallyl maleate. The product was a clear and extremely viscous semi-liquid at room temperature. It was likewise compatible with nitrocellulose and soluble in the same solvents as described in Example I.

*Example III*

Test panels coated with films containing nitrocellulose and the copolymer were prepared for comparison with nitrocellulose films containing a widely used non-drying alkyd known in the trade as Rezyl 99 which was and is the alkyd resin containing reacted glycerol phthalic anhydride and cocoanut oil fatty acid. Lacquers were prepared using one part of polymer or alkyd resin per part of R. S. ¼ sec. nitrocellulose in a solvent mixture consisting of 13.2% (wt.) of ethyl alcohol, 42.8% methyl isobutyl ketone and 44% of xylene. The lacquers were sprayed onto clean sheet steel panels. The films containing the copolymers had desired gloss as well as being comparable in hardness and adhesion to the film containing the alkyd resin. This fact is evident from the following tabulated results.

| Constituent Used with R. S. ¼ Sec. Nitrocellulose, 1:1 | Wilkinson Pencil Hardness [1] | Percent Adhesion, Cross Hatch [2] |
|---|---|---|
| Diallyl phthalate-propionate copolymer | 8H | 60 |
| Diallyl maleate-propionate copolymer | 8H | 75 |
| Rezyl 99 | 8H | 77 |
| Poly(allyl acetate) | 8H | 3 |

[1] Gardner, Phys. and Chem. Exam. of Paints, etc., vol. 9, p. 125.
[2] Ibid., p. 113.

It will be noted that the poly(allylacetate), the homopolymer of allyl acetate, gave a film which had such poor adhesion that it was unsuitable for use.

*Example IV*

Durability of nitrocellulose films containing the copolymers described in Examples I and II or the non-drying alkyd (Rezyl 99) were tested by prolonged exposure to the weather in California. Lacquers were prepared containing one part of copolymer or alkyd resin per part of R. S. ½ sec. nitrocellulose and 0.2 part of dibutyl phthalate as plasticizer in a solvent mixture consisting of 44% toluene, 42.7% methyl isobutyl ketone and 13.3% ethyl alcohol. The solids content of the lacquers together with the viscosity thereof are given in the table below. The lacquers were sprayed on steel panels using successive coatings until the dried film had a thickness of one mil. The coated panels were then exposed to the atmosphere in California at a 45° angle facing south. After exposure for the times noted in the table, the panels were compared for rating with the photographic standards of A. S. T. M. tests on blistering (D714-45) and flaking D772-44T). For the blister rating, the scale ranges from No. 10 indicating no blisters down to No. 0 which represents very large size blisters, and the percentage of surface covered with the blisters is indicated. Likewise, the flaking standards range from No. 10 for no development of flaking down to No. 0 for very severe flaking. In other words, the employed standard scales are such that the smaller the scale number the greater the deterioration. Moreover, the extent of difference between scale numbers advances sharply. Thus, pin-point blisters are rated as No. 8 and No. 6 blisters are about 1/16 inch diameter. The results of the exposure test are given in the following table.

| Resin Constituent Used with Nitrocellulose | Percent solids in Lacquer | Viscosity, Secs. (No. 4 Ford Cup) | Blister Rating After 7 Months | Flaking Rating After 7 Months |
|---|---|---|---|---|
| Diallyl phthalate-propionate copolymer | 17.5 | 17.9 | No. 10, 100% Surf. | No. 10. |
| Diallyl maleate-propionate copolymer | 18.4 | 21.3 | No. 10, 100% Surf. | No. 10. |
| Rezyl 99 | 17.6 | 21.4 | No. 7, 96% Surf. | No. 2. |

The exposure with the films containing the copolymers was continued until a 13 months total time had elapsed. By that time, it was conservatively estimated that very slight deterioration had occurred but not sufficient to rate an increase of full degree on the A. S. T. M. scales. The rating for the compositions containing the copolymers was thus only Nos. 9–10 on both the flaking and blistering scales. The panels (quadruplicate as checks) coated with the film containing the alkyd resin had deteriorated so badly in the seven months' exposure (to No. 2 on the flaking scale) that exposure thereof was discontinued after that time. The foregoing demonstrates the marked superiority of the compositions containing the copolymers with respect to their durability against weathering.

The new copolymer which gives the advantageous property of markedly improved durability when used in admixture with nitrocellulose has a sufficient amount of diallyl ester chemically combined (copolymerized) with the monoallyl ester so that the improved properties are realized, but nevertheless, the copolymer is permanently fusible. It may be remarked that a fusible polymer of a diallyl ester can be obtained by careful polymerization of the diallyl ester alone and interrupting the polymerization operation before the formed polymer gels or becomes infusible. However, this temporarily fusible homopolymeric diallyl ester is not suitable for use in nitrocellulose in coatings because of the transient character thereof. The fusible homopolymer undergoes further change with cross-linking so that it gels and finally becomes infusible, the gel and infusible polymer being insoluble in all lacquer solvents as well as usually being incompatible with nitrocellulose. It may also be remarked that the homopolymers of allyl esters of saturated fatty acids act primarily as plasticizers when used with nitrocellulose. Ordinarily, they cannot be used in as high percentages with nitrocellulose as the copolymers of the invention without softening the films to greater extent due to this plasticizing action. Moreover, they do not impart the property of adhesion to the nitrocellulose films which is one of the principal reasons for incorporating a resin with nitrocellulose.

The new products of the present invention differ critically from copolymers, in general, of a diallyl ester of dicarboxylic acids and an allyl ester of a saturated fatty acid, or from homopolymers of either of such esters. The stiffening point of the new copolymers is high and such that it gives mixtures with nitrocellulose sufficiently hard for utility, but at the same time, they remain permanently fusible so as not to be subject to the adverse change to gels or infusible polymeric forms. The new products achieve this new combination of properties by the proportion of diallyl ester chemically combined with the monoallyl ester. The resin of the invention is thus a permanently fusible copolymer of a diallyl ester of a saturated fatty acid containing such a proportion of copolymerized diallyl ester that (1) the stiffening point of the copolymer is at least 10° C. above the stiffening point of a homopolymer of said monoallyl ester. In addition, the copolymer is (2) resistant against gelation and infusibilization when heated at 130° C. for 50 hours in the presence of 2% of a peroxide polymerization catalyst such as di(tertiary amyl) peroxide. The stiffening point allyl ester was blown from the polymerized reaction mixture with carbon dioxide at 150° C. under 1 to 3 mm. pressure. The weight of copolymer remaining enabled determination of the percentage conversion to copolymer. In those cases where gelation had occurred, no determination of percentage conversion was possible because the gelation entrapped monomeric monoallyl ester so that its removal was not possible. Consequently, the percentage of diallyl ester in the gelled copolymers is not given.

| Example | Mono-Ester | Di-Ester | Time, Hours | Percent Di-Ester in Monomer Mixture | Percent Conversion to Copolymer | Percent Di-Ester in Copolymer |
|---|---|---|---|---|---|---|
| V | Allyl acetate | Diallyl diglycolate | 89.7 | 5 | 88 | 5.7 |
| VI | do | do | 117.7 | 7 | 93 | 7.5 |
| VII | do | do | 41.7 | 10 | (1) | |
| VIII | do | Diallyl maleate | 89.7 | 5 | 85 | 5.9 |
| IX | do | do | 89.7 | 6 | (1) | |
| X | do | do | 40 | 10 | (1) | |
| XI | do | Diallyl phthalate | 88 | 5 | 87 | 5.7 |
| XII | do | do | 62 | 12.5 | 92 | 13.6 |
| XIII | do | do | 46.5 | 15 | (1) | |
| XIV | do | do | 46.5 | 17.5 | (1) | |
| XV | Allyl propionate | Diallyl maleate | 25 | 7 | 89 | 7.9 |
| XVI | do | Diallyl phthalate | 25 | 9 | 77.6 | 11.6 |
| XVII | Allyl laurate | do | 143.5 | 2.4 | 99 | 2.4 |
| XVIII | do | do | 143.5 | 5.1 | 99 | 5.2 |

1 Gelled.

of a polymer is the temperature at which upon cooling 20 grams of polymer in a test tube in a Dry Ice-acetone bath, the polymer becomes so stiff that it can be stirred only with difficulty. The stiffening point is substantially identical with the pour point, a well known test ordinarily applied to lubricating oils.

The copolymers are prepared by heating proper proportions of the diallyl ester with the monoallyl ester in the presence of a peroxide polymerization catalyst whereby copolymerization of the two esters occurs. In order to realize to fullest extent the advantageous properties of the copolymer, it is desirable to have the copolymer contain the largest possible proportion of combined diallyl ester, i. e., at least 5% chemically combined diallyl ester. Consequently, the copolymer is prepared by subjecting to polymerization a mixture consisting of the two allyl esters containing the maximum fraction of the diallyl ester, but less than that at which gelation of the reaction mass occurs. The particular amount of this maximum proportion is not definable as a single numerical value for all cases since it is subject to variation dependent upon the particular diallyl ester utilized, the particular monoallyl ester employed therewith and the conditions of copolymerization. For example, a permanently fusible copolymer of diallyl phthalate and allyl propionate may contain 10% to 25% of diallyl phthalate chemically combined therein.

The variation in maximum proportion of the diallyl ester will be evident from the results tabulated below. In each example the indicated mixture of esters was heated in a vessel fitted with a reflux condenser for a noted time. With the mixture containing allyl acetate a temperature of 130° C. was used, with allyl propionate 150° C., and with allyl laurate 110° C. Each of the mixtures also contained an added 2% of di(tertiary amyl) peroxide with the exception of Examples XV and XVI wherein 2% of di(tertiary butyl)-peroxide was employed. The unreacted mono- The above permanently fusible copolymers (non-gels) were flexible solids (acetates) to extremely viscous semi-liquids, all of which were soluble in each of acetone, methyl isobutyl ketone or normal butyl acetate as well as being compatible with R. S. ½ sec. nitrocellulose in all ratios from 1:2 to 10:1 (resin : nitrocellulose). Films of copolymer and the nitrocellulose laid on glass from 20% solutions in normal butyl acetate were clear, colorless and so hard that they could not be scratched with the fingernail unless 5 times as much copolymer as nitrocellulose was used.

The ascertainment of whether a permanently fusible copolymer is obtained is easily accomplished. Ordinarily use of too high a proportion of diallyl ester will result in gel formation during the course of copolymerization if it is continued until about 70 to 80% conversion to copolymer is obtained. However, in border-line cases where it is suspected that the prepared copolymer contains sufficient residual olefinic unsaturation so as to permit cross-linking and possible gelation occurring during subsequent use thereof, this fact may be determined by heating a sample of the copolymer at 130° C. for 50 hours in the presence of an added 2% di(tertiary amyl) peroxide. If the test treatment does not cause gel formation, the copolymer is permanently fusible.

The copolymers are obtained by heating the mixture of esters at a temperature of about 100° C. to 250° C. in the presence of a peroxide polymerization catalyst. In those cases where the operating temperature is above the boiling point of the polymerization mixture, it is desirable to use superatmospheric pressures at least equal to the autogenic pressure. The catalyst employed is an organic peroxide such as benzoyl peroxide, lauroyl peroxide, benzoyl acetyl peroxide, tertiary butyl hydroperoxide, such as 2,2-di(tertiary butyl peroxy)propane and 2,2-di(tertiary butyl peroxy)butane or di(tertiary alkyl)peroxides like di(tertiary butyl)peroxide and di(tertiary allyl)peroxide. Various amounts of catalyst may be used, 0.1 to 5% being suitable. Good results are obtained with about 1 to 2%. If desired, air may be dispersed through the reaction mixture to act as catalyst in effecting the copolymerization.

As pointed out before, the permissible maximum proportion of diallyl ester in the mixture subjected to polymerization is not only dependent upon the particular allyl esters employed but is also influenced by the polymerization conditions. In general, by using higher operating temperatures during copolymerization, the permissible proportion of diallyl ester may be increased. The results given below illustrate this fact. The polymerization of the indicated compositions was effected under pressure and the unpolymerized allyl propionate removed by blowing with carbon dioxide under vacuum. Also given in the table are Sward hardness values for films containing equal parts of the copolymer and R. S. ½ sec. nitrocellulose. The films were prepared from a lacquer containing 15% solids in a mixture of 56% normal butyl acetate, 4% ethyl alcohol and 40% xylene. After spraying on metal panels, the films were allowed to condition for 11 days before measuring the hardness. It is evident that harder films are obtained when the copolymer contains larger proportions of the diallyl ester.

ing solutions of lower viscosity have definite advantage due to the fact that the limiting factor with regard to solids concentration is the sprayable viscosity. Moreover, even though advantage is not taken of the lower viscosity properties to build up the solids concentration, it is possible to decrease the cost by using a greater proportion of relatively cheap hydrocarbon diluent and thus maintain the same solids concentration and viscosity.

Allyl esters of various saturated monocarboxylic acids such as up to 18 carbon atoms may be contained in the two component copolymers like, for example, allyl acetate, propionate, butyrate, valerate, caproate, caprylate, pivalate, caprate, laurate, stearate, etc. All of the permanently fusible copolymers of a diallyl ester of a dicarboxylic acid and an allyl ester of a saturated fatty acid of the invention are soluble in such solvents as normal butyl acetate or acetone and are compatible with nitrocellulose. Consequently, all are suitable for use with nitrocellulose so as to form a homogenous mixture therewith in some applications such as plastic molding compositions. However, the properties of some of the copolymers are so markedly different in kind that they constitute a distinctive separate class. Reference is made to copolymers containing an allyl ester of a saturated fatty acid of 3 to 6 carbon

| Example | Per Cent Diallyl phthalate in mixture with allyl propionate | Per Cent tert-butyl hydroperoxide | Temp., °C. | Hours heating | Per Cent Conv. | Sward Hardness of films containing equal parts of copolymer with R. S. ½ sec. nitrocellulose |
|---|---|---|---|---|---|---|
| XIX | 10 | 2 | 200-210 | 3 | 38 | 20 |
| XX | 15 | 2 | 180-220 | 2 | 41 | 29 |

In preparing the two component copolymer of the allyl esters of saturated fatty acids, diallyl esters of various dicarboxylic acids may be employed. Thus, beside the diallyl esters mentioned hereinbefore, there may be used diallyl esters or such other representative acids as saturated dicarboxylic acids like oxalic acid, malonic acid, succinic acid, adipic acid, sebacic acid, etc.; of alicyclic acids like cyclopentane dicarboxylic acid, cyclohexane dicarboxylic acid, etc.; of unsaturated acids like fumaric acid, itaconic acid, citraconic acid, dilinoleic acid and other polymerized fatty acids, etc.; and of aromatic dicarboxylic acids such as isophthalic acid, teraphthalic acid, methyl phthalic acid, dimethyl phthalic acid, butyl phthalic acid, naphthelene dicarboxylic acid, etc. The copolymers containing a diallyl ester of an aromatic dicarboxylic acid form a particularly preferred group especially from acids containing up to 10 carbon atoms. By an aromatic dicarboxylic acid, reference is made particularly to an acid having the carboxyl groups linked directly to an arylene, e. g. phenylene, radical. The copolymers containing diallyl ester of aromatic dicarboxylic acids are preferred because compositions thereof with nitrocellulose employed in solvents, i. e., lacquers, have lower viscosity for a given solids content. This property is of great advantage. It is usually most economical to have as high a solids content as possible in nitrocellulose lacquer in order to decrease the number of coats necessary, and consequently, make a saving in both labor and material (the solvent). Film-forming materials givatoms (6 to 9 carbon atoms in the ester), which class consists of allyl propionate through allyl caproate. This special class of copolymer is characterized by exceptionally good tolerance to the presence of aromatic hydrocarbon diluent in the solvent mixture employed to prepare lacquer containing the copolymer and nitrocellulose. In contrast thereto copolymers containing allyl acetate have virtually no tolerance for such hydrocarbon diluent.

The foregoing facts will be more evident from the consideration of the data tabulated below which illustrates properties of various copolymers. In the compositions a solvent mixture was employed containing 56% by weight of normal butyl acetate, 40% of toluene and 4% of ethyl alcohol. Experience has shown that this solvent mixture was sufficiently rich in esters to give low viscosities and contained sufficient toluene to possess good resin solvency. The viscosities of the solution were measured with a Hercules capillary tube viscometer at 25° C. The copolymers were prepared as described in the indicated examples. The resin denoted by the trade name Glyptal 2477 was and is a commercial non-drying alkyd used widely with nitrocellulose. It is prepared in usual fashion and contains reacted glycerol, phthalic anhydride and castor oil or castor oil fatty acid. Also included in the table is a column giving the solids content of solutions having a viscosity of 40 centipoises which is a normal spraying viscosity. The nitrocellulose was lacquer grade known as R. S. ½ sec. nitrocellulose.

| Resin | Example Describing Copolymer Preparation | Ratio Resin: Nitro-cellulose | Percent Solids | Visc., Cp. | Percent Solids at 40 Cp. Visc. |
|---|---|---|---|---|---|
| Poly(allyl propionate-phthalate) | I | 1:1 | 15 | 56.7 | 13.5 |
| | | 1:2 | 23.5 | 360 | |
| | | 2:1 | 15 | 17.6 | 18.9 |
| | | 2:1 | 221 | 117 | |
| Poly(allyl propionate-maleate) | II | 1:1 | 15 | 67.8 | 12.6 |
| | | 1:1 | 23.5 | 421 | |
| | | 2:1 | 15 | 22.2 | 17.6 |
| | | 2:1 | 24 | 170 | |
| Rezyl 99 | | 1:1 | 15 | 67.2 | 13.0 |
| | | 1:1 | 24 | 723 | |
| | | 2:1 | 15 | 25.1 | 17.3 |
| | | 2:1 | 24 | 164 | |
| Glyptal 2477 | | 1:1 | 15 | 16.3 | 13.2 |
| | | 1:1 | 23.5 | 539 | |
| | | 2:1 | 15 | 30.2 | 16.3 |
| | | 2:1 | 24 | 221 | |
| Poly(allyl acetate) | | 1:1 | 15 | 96.9 | |
| | | 1:1 | 23.5 | Thixotropic | |
| | | 2:1 | 15 | 30.3 | |
| | | 2:1 | 24 | 270 | |
| Poly(allyl acetate-phthalate) | XII | 1:1 | 15 | Insoluble | |
| | | 1:1 | 23.5 | ---do | |
| | | 2:1 | 15 | ---do | |
| | | 2:1 | 24 | ---do | |
| Poly(allyl acetate-maleate) | VIII | 1:1 | 15 | Insoluble | |
| | | 1:1 | 23.5 | ---do | |
| | | 2:1 | 15 | ---do | |
| | | 2:1 | 24 | ---do | |
| Poly(allyl acetate-diglycolate) | VI | 1:1 | 15 | Insoluble | |
| | | 1:1 | 23.5 | ---do | |
| | | 2:1 | 15 | ---do | |
| | | 2:1 | 24 | ---do | |

The various grades of nitrocellulose may be used with the copolymers of the invention. Ordinarily, use in surface coating lacquer employs R. S. ½ sec. nitrocellulose although lower viscosity grades like R. S. ¼ sec. or higher viscosity grades like R. S. 6 sec. may be used if desired. This established standard of viscosity grade for nitrocellulose is explained in ASTM test D301–33.

The copolymers may be employed in any desired ratio with nitrocellulose including weight ratios of copolymer to resin from 10:1 to 1:2. Ordinarily, in lacquer formulation ratios from 3:1 to 1:1 are utilized. The compositions of the invention may contain the usual other ingredients such as plasticizers like tricresyl phosphate, dibutyl phthalate, dioctyl phthalate, etc., as well as pigments. The copolymers are particularly useful in compositions containing acid sensitive pigments because the copolymers have acid No. of 0, which is virtually impossible to obtain with the non-drying alkyds employed heretofore. The copolymers have only acyloxy radicals linked directly to the polyallyl radicals.

When using the composition as lacquers the usual lacquer solvents are employed as vehicle therefore. Thus, the lacquer will contain as liquid vehicle such materials as nitrocellulose solvents like ethyl acetate, isopropyl acetate, normal butyl acetate, methyl ethyl ketone, methyl isobutyl ketone, latent solvents like ethyl alcohol, isopropyl alcohol, normal butyl alcohol or methyl isobutyl carbinol, as well as diluents such as toluene, xylene, and the usual petroleum fractions employed for this purpose. The proportion of diluents to solvents and latent solvents is adjusted in usual fashion so that all of the nitrocellulose and copolymer is dissolved in the lacquer.

We claim as our invention:

1. A permanently fusible copolymer of a mixture consisting essentially of a diallyl ester of a dicarboxylic acid and an allyl ester of a saturated fatty acid, said copolymer containing such proportion of said diallyl ester chemically combined therein that said copolymer has a stiffening point at least ten degrees centigrade above the stiffening point of homopolymer of said monoallyl ester, but not such a high proportion that the copolymer gels upon being heated at 130° C. for 50 hours in the presence of an added 2% of di(tertiary amyl) peroxide.

2. A permanently fusible copolymer of a mixture consisting essentially of a diallyl ester of an aromatic dicarboxylic acid of up to 10 carbon atoms and an allyl ester of a saturated fatty acid, said copolymer containing a sufficient proportion of said diallyl ester chemically combined therein that the stiffening point of said copolymer is at least ten degrees centigrade above the stiffening point of homopolymer of said monoallyl ester, but not such a high proportion that the copolymer gels when heated at 130° C. for 50 hours in the presence of an added 2% of di(tertiary amyl) peroxide.

3. A permanently fusible copolymer of a mixture consisting essentially of a diallyl ester of a dicarboxylic acid and an allyl ester of a saturated fatty acid of 3 to 6 carbon atoms, said copolymer containing at least 5% of said diallyl ester chemically combined therein, but not such a high percentage that said copolymer gels upon being heated at 130° C. for 50 hours in the presence of an added 2% of di(tertiary amyl) peroxide.

4. A permanently fusible copolymer of a mixture consisting essentially of diallyl phthalate and allyl propionate, said copolymer containing such a proportion of chemically combined diallyl phthalate therein that said copolymer has a stiffening point at least ten degrees centigrade above the stiffening point of polyallyl propionate, but not such a high proportion that the copolymer gels when heated at 130° C. for 50 hours in the presence of an added 2% of di(tertiary amyl) peroxide.

5. A permanently fusible copolymer of a mixture consisting essentially of diallyl phthalate and allyl propionate, said copolymer containing 10% to 25% of diallyl phthalate chemically combined therein and said copolymer being resistant against gelation when heated at 130° C. for 50 hours in the presence of an added 2% of di(tertiary amyl) peroxide.

6. A permanently fusible copolymer of a mixture consisting essentially of diallyl maleate and allyl propionate, said copolymer containing at least 5% of chemically combined diallyl maleate therein, but not such a high percentage that said copolymer gels when heated at 130° C. for 50 hours in the presence of an added 2% of di(tertiary amyl) peroxide.

7. A permanently fusible copolymer of a mixture consisting essentially of diallyl diglycolate and allyl propionate, said copolymer containing at least 5% of chemically combined diallyl diglycolate therein, but not such a high percentage that said copolymer gels when heated at 130° C. for 50 hours in the presence of an added 2% of di(tertiary amyl) peroxide.

8. A composition comprising one part by weight of nitrocellulose in homogenous admixture with 0.5 to 10 parts of a permanently fusible copolymer of a mixture consisting essentially of a diallyl ester of a dicarboxylic acid and an allyl ester of a saturated fatty acid, said copolymer containing such a proportion of said diallyl ester chemically combined therein that said copolymer has a stiffening point at least ten degrees centigrade above the stiffening point of homopolymer of said monoallyl ester, but not such a high proportion that the copolymer gels upon being heated at 130° C. for 50 hours in the presence of an added 2% of di(tertiary amyl) peroxide.

9. A composition comprising one part by weight of nitrocellulose in homogenous admixture with 0.5 to 10 parts of a permanently fusible copolymer of a mixture consisting essentially of a diallyl ester of an aromatic dicarboxylic acid of up to 10 carbon atoms and an allyl ester of a saturated fatty acid, said copolymer containing a sufficient proportion of said diallyl ester chemically combined therein that the stiffening point of said copolymer is at least ten degrees centigrade above the stiffening point of homopolymer of said monoallyl ester, but not such a high proportion that the copolymer gels when heated at 130° C. for 50 hours in the presence of an added 2% of di(tertiary amyl) peroxide.

10. A composition comprising one part by weight of nitrocellulose in homogenous admixture with 1 to 3 parts of a permanently fusible copolymer of a mixture consisting essentially of a diallyl ester of a dicarboxylic acid and an allyl ester of a saturated fatty acid of 3 to 6 carbon atoms, said copolymer containing at least 5% of said diallyl ester chemically combined therein, but not such a high percentage that said copolymer gels upon being heated at 130° C. for 50 hours in the presence of an added 2% of di(tertiary amyl) peroxide.

11. A composition comprising one part by weight of nitrocellulose in homogenous admixture with 0.5 to 10 parts of a permanently fusible copolymer of a mixture consisting essentially of diallyl phthalate and allyl propionate, said copolymer containing such a proportion of chemically combined diallyl phthalate therein that said copolymer has a stiffening point at least ten degrees centigrade above the stiffening point of polyallyl propionate, but not such a high proportion that the copolymer gels when heated at 130° C. for 50 hours in the presence of an added 2% of di(tertiary amyl) peroxide.

12. A composition comprising one part by weight of nitrocellulose in homogenous admixture with 1 to 3 parts of a permanently fusible copolymer of a mixture consisting essentially of diallyl phthalate and allyl propionate, said copolymer containing 10% to 25% of diallyl phthalate chemically combined therein and said copolymer being resistant against gelation when heated at 130° C. for 50 hours in the presence of an added 2% of di(tertiary amyl) peroxide.

13. A composition comprising one part by weight of nitrocellulose in homogenous admixture with 1 to 3 parts of a permanently fusible copolymer of a mixture consisting essentially of diallyl maleate and allyl propionate, said copolymer containing at least 5% of chemically combined diallyl maleate therein, but not such a high percentage that said copolymer gels when heated at 130° C. for 50 hours in the presence of an added 2% of di(tertiary amyl) peroxide.

14. A composition comprising one part by weight of nitrocellulose in homogenous admixture with 1 to 3 parts of a permanently fusible copolymer of a mixture consisting essentially of diallyl diglycolate and allyl propionate, said copolymer containing at east 5% of chemically combined diallyl diglycolate therein, but not such a high percentage that said copolymer gels when heated at 130° C. for 50 hours in the presence of an added 2% of di(tertiary amyl) peroxide.

RICHARD R. WHETSTONE.
THEODORE W. EVANS.

REFERENCES CITED

The following references are of record in the file of this patent:

UNITED STATES PATENTS

| Number | Name | Date |
| --- | --- | --- |
| 2,332,461 | Muskat et al. | Oct. 19, 1943 |
| 2,339,058 | D'Alelio | Jan. 11, 1944 |
| 2,378,195 | D'Alelio | June 12, 1945 |
| 2,378,197 | D'Alelio | June 12, 1945 |
| 2,431,374 | D'Alelio | Nov. 25, 1947 |
| 2,446,121 | Adelson et al. | July 27, 1948 |